Nov. 2, 1965        E. A. PETERSON ETAL        3,215,450
                    CASINGS FOR BOOKS
Filed Feb. 18, 1964                    2 Sheets-Sheet 1
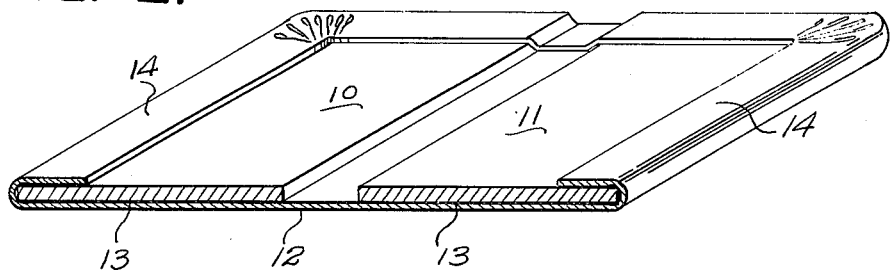
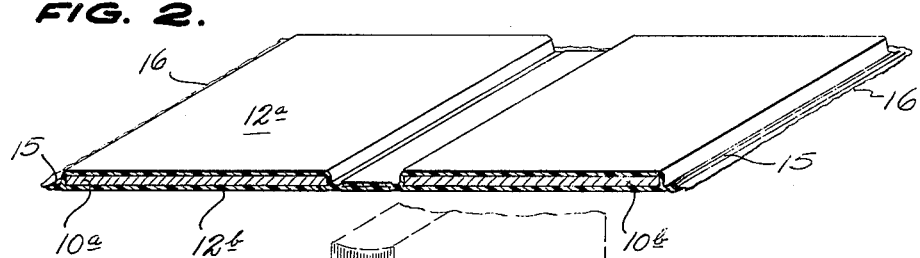
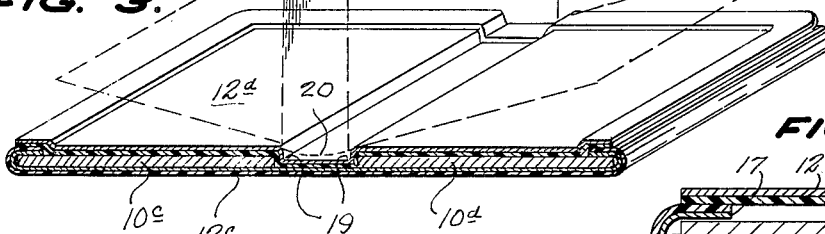
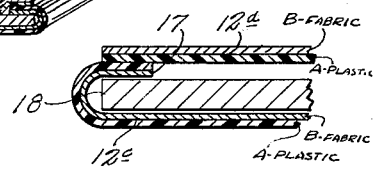
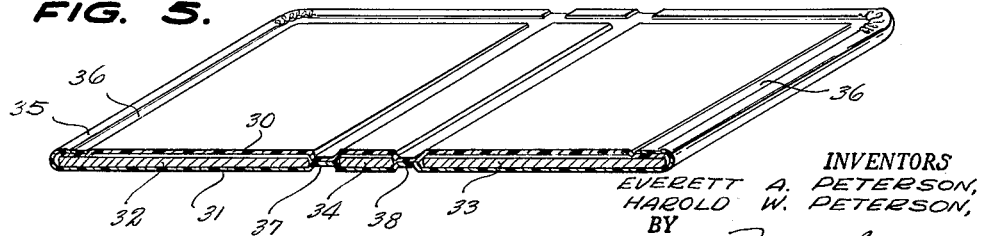
INVENTORS
EVERETT A. PETERSON,
HAROLD W. PETERSON,
BY
Max Hall
ATTORNEY.

Nov. 2, 1965    E. A. PETERSON ETAL    3,215,450
CASINGS FOR BOOKS

Filed Feb. 18, 1964    2 Sheets-Sheet 2

INVENTORS
EVERETT A. PETERSON
HAROLD W. PETERSON

BY

ATTORNEY

United States Patent Office 3,215,450
Patented Nov. 2, 1965

3,215,450
CASINGS FOR BOOKS
Everett A. Peterson, Roslyn Heights, and Harold W. Peterson, Roslyn, N.Y., assignors to Peterson Electronic Die Co. Inc., Mineola, N.Y., a corporation of New Jersey
Filed Feb. 18, 1964, Ser. No. 350,932
16 Claims. (Cl. 281—29)

This invention is a continuation-in-part of our application Serial No. 838,167, filed September 4, 1959, now abandoned.

This invention relates to a casing for a book and is primarily concerned with the use of thermoplastic materials for the casing material. In the prior art, cases for books have been made of various kinds of fabrics and leathers, all of which required the use of adhesives or glues to bond the fabrics to the cover filler boards and to bond the books to the covers. With the advent of resinous sheet materials, commonly called plastics, various attempts were made to use such materials as polyvinyl chloride, for example, for a cover material, but it was quickly found that such materials could not be bonded to each other or to other materials with glue, as the plastics would not take glue. These materials, however, being thermoplastic in nature, could be adhered to each other by high or radio frequency welding, but this resulted in what is known in the art as a "tear seal," wherein a marginal portion adjacent the sealed parts was torn off after welding along the impression made by the welding dies. This "tear seal" frequently left a sharp or unsightly edge around the cover of a book and was also undesirable for many types of cases. It was especially unsuitable for edition bindings or bindings for expensive books of better character and quality than usual, as for libraries and the like.

The resinous plastics, however, have many properties which are highly desirable for use as book covers. They are tough, strong, scuff resistant, waterproof, can be made in various colors or color combinations, can be embossed, screen printed and vacuum formed, and as used according to this invention are relatively cheap because of the labor saved in manufacturing a case as compared with prior art methods of producing a comparable book cover.

In the prior art case making methods, special binder's board was used for the covers because it tends to warp less when subjected to moisture. When case making according to this invention, cheap chip board may be substituted for the expensive binder's board heretofore used as the hazard of warping is eliminated. This invention also eliminates the necessity for the long period of pressing time heretofore required to hold the filler boards flat until the glue of the case making operation has dried, with consequent saving of storage space occupied during this period.

Thus, a principal object of this invention is to provide a cover or casing for a book which is made of thermoplastic material and which can be fastened or bonded to itself, to a book cover filler, if desired, to the end sheets, and to a signature, by the use of an adhesive. This is accomplished by first bonding to the thermoplastic sheet, by calendering or otherwise, a thin layer of fabric material, to provide a laminated sheet which is used for the case making material. This laminated sheet is then used, according to the method of this invention, on the inner and outer surfaces of the filler board, in a manner which permits the thermoplastic portions to be bonded to each other by thermal or other means to form a book cover or casing which seems conventional in appearance, having no tear seal edge, and to which the end sheets and signatures of the book can be adhesively bonded. This produces a casing which has all the advantages of a conventional casing, and which has also many advantages in addition to those, but avoids some of the disadvantages.

In a modified form of the invention, thermoplastic material alone is used for the cover material and is bonded to the cover boards in such a manner that the customary "tear seal" is eliminated.

For a more complete description of the invention, reference is made to the accompanying drawings and specification, illustrating and describing practical embodiments of the invention; and in which:

FIGURE 1 is a perspective view, partly in section, of one of the steps in a prior art method of making a casing for a book;

FIGURE 2 is a similar view of another prior art method, wherein thermoplastic sheets are used for the casemaking, the sheets being welded together along their contacting marginal edges, leaving a marginal waste portion which is torn off;

FIGURE 3 is a similar view, showing a construction according to the teaching of this invention, with a laminated sheet being used for the casemaking;

FIGURE 4 is an enlarged sectional detail of one corner of the construction shown in FIGURE 3; and FIGURE 5 shows a modified form of the invention;

Figure 6:
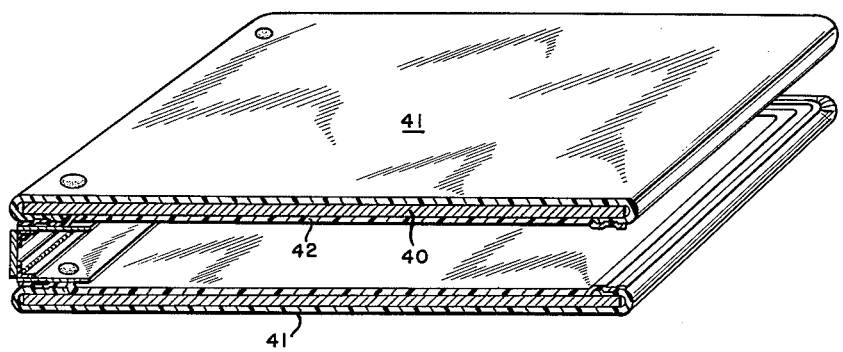
FIGURE 6 is a perspective view, partly in section, of another modified form of the invention.

FIGURES 7-12, inclusive, show enlarged sectional details of various arrangements of the cover materials with respect to the filler boards.

As shown in FIGURE 1, according to the prior art, the binder's boards 10, 11 forming the sides of the book provide a base to which the cover fabric of cloth, leather or buckram 12 is glued over the entire area of contact with the binder's board, as at 13. The free peripheral portions 14 are turned over the edges of the binder's board and are adhesively secured thereto along the inner marginal edges, and the pleats formed at the corners during this step are glued to themselves and to the board. The signatures and end sheets of the book (not shown) are then fixed in place, the end sheets being glued to the upper faces of the binder's board, the backbone of the book being similarly attached to the casing fabric between the binder's boards. This type of construction is subject to and deteriorates under conditions of scuffing, moisture, rough handling. Labor is taken up in applying adhesives, in placing the covers in clamps or presses, valuable space is taken up while storing the cases until the adhesive has dried, and time is lost during the drying process.

As shown in FIGURE 2, according to another prior art practice, a polyvinyl plastic sheet 12a, 12b is placed above and below the respective boards 10a, 10b, which may be cheap chip board. The edges of the plastic sheets overlap the edges of the boards and the overlapping portions are electronically welded or heat sealed at 15 forming a tear seal, which means that an outer peripheral waste portion 16 is left which is torn away, along the impression made by the welding die thereby leaving the rough, often sharp edge around the perimeter of such board or side of the finished book. This type of construction has the advantage, however, that the boards 10a, 10b do not have to be glued to the casing material, that cheap board material can be used as it is fully protected against moisture by the waterproof material, and that the finished book feels better in the hand because the cover material is not glued to the filler board and can slip just a little with respect to it. The cover does not have the hard or brittle surface of the conventional book.

In the practice of the present invention shown in FIGURES 3 and 4, cheap chip boards 10c, 10d form the sides of the book and the cover material comprises a sheet A of one of the thermoplastic resins, such as polyvinyl chloride, to which an overlay of some open mesh fabric material B, such as cotton, for example, is applied by calendering or otherwise to the plastic sheet. Some papers, such as kraft, are also suitable for this purpose, and in general any material to which another may be adhesively bonded, may be used for the laminating material. This lamination of fabric and vinyl is applied to the filler boards 10c, 10d by placing one above and one below said boards as shown, the lower sheet 12c being slightly longer and wider than the upper sheet 12d, both sheets being applied with the fabric face B up. The lower sheet 12c is then turned in over the edges of the filler boards as at 17, to present the vinyl face up. The upper sheet 12d, with its vinyl face down is then arranged so that its pheripheral portions overlap the turned over marginal portions 17 of the lower sheet, which brings the plastic faces on the two sheets into contact, over the filler boards and inwardly of their edges 18. These contacting plastic faces are then welded together by radio frequency with appropriate sealing dies in a manner well known in the art, trapping the filler boards within the periphery of the bond. A similar seal may be made at the points 19 between the spaced filler boards to accommodate the backbone of the book shown in phantom lines, and to form a hinge between the backbone and the sides of the book. This arrangement leaves the fabric face B of the laminated cover sheet facing upwardly. To this fabric face the backbone 20 and end sheets 21 of a book may be secured by an appropriate adhesive, such as binder's glue.

This construction and arrangement embodies all the advantages of the prior art methods discussed with respect to FIGURES 1 and 2, without having any of the disadvantages thereof. The seal of the plastic materials to each other eliminates the objectionable tear seal and places the seal inwardly of the edges of the case so that in all respects the case resembles a conventional book cover. It has the advantage that the outer plastic face can be stamped, embossed, printed just as if it were leather, is moisture proof and more wear and scuff resistant than cover materials heretofore used for this purpose, and will lend itself to the binding of edition and library types of works for which the tear seal type of construction was unacceptable.

In the modified form of the invention shown in FIGURE 5, the method taught with respect to FIGURES 3 and 4 is used to cover the binder's board, but the covering is not a laminated material as discussed above. Instead, sheet plastic, of appropriate grade, quality and thickness, is used for the inner and outer covers 30, 31, which overlie the binder's boards. In this instance, three boards are provided, two end boards 32, 33 forming the sides, and one intermediate board 34 of substantially narrower width, for the backbone stay of the book. The upper plastic sheet 30 is laid over the upper surface of the boards 32, 33, 34, the latter being arranged with spaces between their adjoining edges as shown, these spaces being covered by the plastic sheet. The lower plastic sheet 31, likewise extends over the entire area of the lower surface of the boards as shown and has a marginal portion which projects beyond the outer edges. This marginal portion 35 is turned over the outer edges of the boards around their entire outer perimeter and is folded over the underlying portion of the sheet 30 in a manner similar to that described with respect to FIGURE 4. The sheets are then welded or seamed together by the use of radio frequency and pressure to form the seal along the line 36 as shown. The sheets are also joined together at 37, 38 in the spaces between the boards 32, 33, 34. In this manner, a casing for a book is made with plastic covers, but without the objectionable tear seal, giving the book a conventional appearance. A casing according to this form of the invention is particularly well adapted for split-ring binders, in which the metal backbone for the rings is riveted to the backbone stay 34 through the plastic.

In the form of the invention shown in FIGURE 6, a book cover is made by utilizing a single, separate filler board for each side of the book, each separate filler board being covered as taught according to this invention, the two boards being connected to any hinged form or other form of back such as are well known in the art. Thus, the filler boards 40 are each covered on each face with a thermoplastic sheet according to the teaching of this invention, the outer covering 41 being turned and folded over the marginal edges of the board, the inner liner 42 being lapped with respect to the marginal folded portions of the outer cover sheet.

Figure 7:
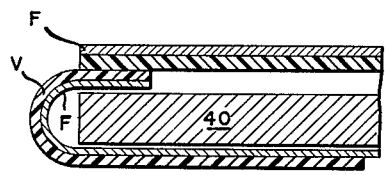
Figure 8:
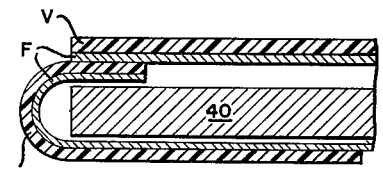

Various arrangements and relationships of cover materials are shown in FIGURES 7–12, inclusive. In each of these figures, 40 denotes the filler board, V denotes a thermoplastic material such as polyvinyl chloride, for example, and F denotes an open mesh fabric of cotton or other suitable material. In these figures the materials are shown prior to welding. Thus, the covering sheets for the filler boards may be single sheets of thermoplastic material or they may be laminated sheets comprising a layer of thermoplastic and a layer of open mesh fabric of cotton or some other suitable material, the layers being suitably bonded together by heat or radio frequency and pressure. Either the fabric layer or the thermoplastic layer may be exposed in the finished article. As shown in FIGURE 7, for example, the filler board may be covered on both faces with such a laminated fabric, the sheets being so arranged that the themoplastic faces are in intimate contact with one another. In FIGURE 8, the laminated sheets are so arranged that one fabric face is in contact with a sheet of thermoplastic material, but when the sheets are subjected to heat or radio frequency and pressure, the thermoplatic materials of each sheet are welded together through the interstices of the intervening or intermediate layer of open mesh material, whether paper, cloth, or other substances.

Figure 9:
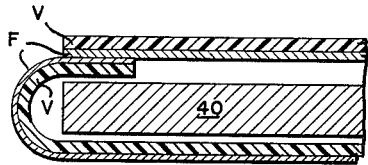

In FIGURE 9, the sheets are arranged so that the thermoplastic face of each laminated sheet is exposed prior to assembly as shown, with the fabric faces in contact with one another after assembly, the weld between the two thermoplastic layers taking effect through the interstices of the fabric layers as explained with respect to FIGURE 8.

Figure 10:
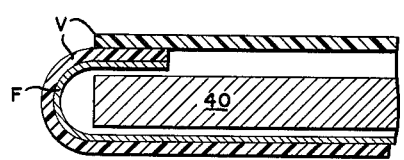
Figure 11:
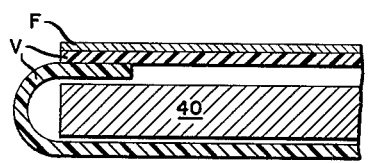
Figure 12:
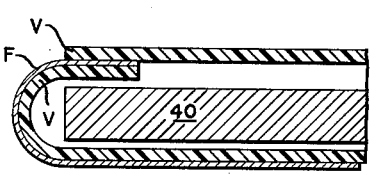

In FIGURES 10–11–12, an arrangement is shown in which one of the sheets is a single ply of thermoplastic material, and the other is a laminated sheet of the nature explained above. Thus, it will be clear that thermoplastic sheets alone, or fabric supported thermoplastic sheets may be used in any desired combination, as covering or casing materials.

While polyvinyl chloride has been mention herein as the resinous plastic sheet material used, it is not intended to limit the invention to the use of this material, as other resins may be used as well. Thus, polyvinyl acetate, vinylchloride-vinyl acetate copolymers, polyvinyl acetate, and others may be used, and the invention is not otherwise intended to be limited except as defined in the appended claims.

What is claimed is:

1. A casing for books and like products having sides connected by and hinged to a book, comprising a filler board for each side of the book, and a cover of laminated sheets of materials dissimilar in kind covering each face of said filler board, one of said materials being common to one face of each of said covers, said common materials on one face of each of said covers being arranged face up with respect to said filler board, said cover on one face of said filler board being turned over the edge of said filler board and over the other face thereof, the cover on the other face of said filler board being secured to said overturned edge, whereby said common material of each cover is joined together where they meet, and the cover on one face of said filler exposes one of said dissimilar materials and the cover on the other face of said filler exposes the other of said materials.

2. A casing according to claim 1, in which said laminated sheets are secured to each other around the peripheries of said filler boards only, said sheets being free of attachment to said filler boards and being slightly movable with respect thereto.

3. A casing for books and like products having sides connected by and hinged to a book, comprising a filler board for each side of a book, said filler board having an inner and an outer face, a laminated cover for each face thereof, said cover comprising a plastic sheet with a fabric overlay, said cover being applied to each face of the filler board with the plastic face down, the free edges of the cover on one face being folded over the adjacent peripheral edges of the filler board to present the plastic face thereof up over the other face of said board, the cover on said other face of said board being disposed with its peripheral portions overlapping said folded free edges to bring the plastic face thereof into contact with the upwardly facing plastic face of the other sheet, said plastic faces being permanently sealed along their contacting portions.

4. A casing according to claim 3, wherein said seal is made substantially inwardly of the edges of said filler board.

5. A book cover comprising a filler board for each side of the book, said filler board having an inner and an outer face, a laminated cover sheet for each face thereof comprising a plastic sheet with a fabric overlay, said sheet being applied to each face of the filler board with the fabric face up, the free edges of the sheet on the outer face being folded over the adjacent peripheral edges of the filler board to present the plastic face thereof up over the inner face of said board, the sheet on the inner face of said board being disposed with its peripheral portions overlapping said folded edges to bring its plastic face into contact with the upwardly facing plastic face of the outer sheet, said plastic faces being permanently sealed along their contacting portions, and a book adhesively secured to the fabric portion of said cover sheet.

6. A book according to claim 5 in which the book has end sheets and a backbone, said end sheets and backbone being adhesively secured to said fabric face.

7. A casing for books according to claim 1, in which the materials similar in kind only are secured to each other, and only over one face of said filler.

8. A casing for books according to claim 1, in which the laminated cover comprises one layer of a resinous plastic material and one layer of a fabric material, said layers being bonded together to form a single sheet.

9. A casing for books and like products having sides connected by and hinged to a back, comprising a filler board for each side of a book, and a laminated cover of sheets of material dissimilar in kind for each face of said filler board, one of said covers being applied over each face of said filler board, with the common material of each cover facing in one direction with respect to the filler board and the other material of each cover facing in the opposite direction with respect to said filler board, one of said covers having a marginal portion projecting over the edges of said filler board, whereby the common materials of each cover are brought into contact with one another, said contacting portions being bonded together.

10. A book cover comprising a filler board for each side of the book, said filler board having an inner and an outer face, a laminated cover sheet for each face thereof comprising a plastic sheet with an overlay adapted to receive and support an adhesive, said cover sheet being applied to each face of the filler board with the overlay face up, the free edges of the sheet on the outer face being folded over the adjacent peripheral edges of the filler board to present the plastic face thereof up over the inner face of said board, the sheet on the inner face of said board being disposed with its peripheral portions overlapping said folded edges to bring its plastic face into contact with the upwardly facing plastic face of the outer sheet, said plastic faces being permanently sealed along their contacting portions, and a book adhesively secured to the overlay portion of said inner cover sheet.

11. A book cover comprising a filler board for each side of the book, said filler board having an inner and an outer face, a cover sheet of flexible thermoplastic material for each inner and outer face thereof, the free edges of the sheet on the outer face being folded over the adjacent peripheral edges of the filler board to form a maginal overlay on said filler board, the sheet on the inner face of said board being disposed over said filler board with its edges overlapping said marginal overlay, said thermoplastic faces being permanently sealed only to each other along their contacting portions, said sheets being independently movable with respect to said filler boards under pressure of the hand, the cover sheets having a flexible feel to the hand throughout their inner and outer plane faces to simulate the feel of leather.

12. A book cover comprising a filler board for each side of the book and a backbone filler between them, said boards and backbone having an inner and an outer face, a single thermoplastic cover sheet for each inner and outer face thereof, the free edges of the sheet on the outer face being folded over the adjacent peripheral edges of the filler boards and backbone to form a marginal overlay on said filler boards and backbone, the sheet on the inner face of said boards being disposed over said filler boards and backbone with its edges overlapping said marginal overlay, but terminating short of the peripheral edges of the fold, said thermoplastic sheets being permanently sealed along their contacting portions only to each other and being movable with respect to the filler board or backbone, said sheets likewise being sealed to each other between the backbone and filler boards, said thermoplastic cover sheets being flexible and free to flow slightly with respect to each face of said filler boards under the pressure of the fingers.

13. A casing for books and the like comprising a filler board for each side thereof, and a covering comprising a sheet of limp, flexible, homogeneous thermoplastic material for each face of said filler boards, a first of said coverings for one face thereof having a length and width substantially coextensive with that of said boards, a second covering for the other face having a length and width greater than that of said boards whereby to provide a marginal extension of said second covering around the edges of said filler boards, said extension being folded over the edges of said filler boards and having a lapping engagement with said first covering to form a marginal contact with said first covering along its marginal portions, said coverings being permanently sealed only to each other and only along those portions of said coverings which are brought into contact with each other, said seal taking effect along a line extending inwardly of the edges of said filler boards.

14. A casing for a book and the like comprising a filler board, a covering for said filler board comprising a sheet of limp, flexible, homogeneous thermoplastic material for each face of said filler board, a first of said coverings for one face thereof having a length and width substantially coextensive with that of said board, a second covering for the other face having a length and width greater than that of said board whereby to provide a marginal extension of said second covering material around the edges of said filler board, said extension being folded over the edges of said filler board and lapping said first covering to form a marginal contact with said first covering along its marginal portions, said coverings being permanently sealed only to each other and only along those portions of said coverings which are brought into contact with each other, said seal taking effect along a line extending inwardly of the edges of said filler boards.

15. The structure of claim 13, in which one of said covers is a laminated sheet, one of said laminations comprising paper.

16. A casing for books and the like comprising a filler board for each side thereof, and a covering comprising thermoplastic material for each face of said filler boards, one of said coverings being a laminated sheet, one of said laminations comprising an open mesh fabric, a first of said coverings for one face thereof having a length and width substantially coextensive with that of said boards, a second covering for the other face having a length and width greater than that of said boards whereby to provide a marginal extension of said second covering around the edges of said filler boards, said extension being folded over the edges of said filler boards and having a lapping engagement with said first covering to form a marginal contact with said first covering along its marginal portions, said coverings being permanently sealed only to each other and only along those portions of said coverings which are brought into contact with each other.

References Cited by the Examiner
UNITED STATES PATENTS

| | | | |
|---|---|---|---|
| 921,873 | 5/09 | McKebbin | 281—35 |
| 1,009,071 | 11/11 | Jensen | 281—29 |
| 2,177,879 | 10/39 | Schade | 281—29 |
| 2,325,673 | 8/43 | Gurwick | 229—53 |
| 2,390,125 | 12/45 | Schade | 281—29 |
| 2,486,330 | 10/49 | Schade | 281—29 |
| 2,505,743 | 4/50 | Rose | 281—29 |
| 2,706,645 | 4/55 | Pitner | 281—29 |

FOREIGN PATENTS 796,063 6/58 Great Britain.

EUGENE R. CAPOZIO, *Primary Examiner.*

LAWRENCE CHARLES, *Examiner.*